US012675980B2

(12) United States Patent
Chen et al.

(10) Patent No.: US 12,675,980 B2
(45) Date of Patent: Jul. 7, 2026

(54) GENERATING A TEST DIFFUSION MODEL

(71) Applicants:International Business Machines Corporation, Armonk, NY (US); National Tsing Hua University, Hsinchu (TW)

(72) Inventors: Pin-Yu Chen, White Plains, NY (US); I-Hsin Chung, Chappaqua, NY (US); Bo Wu, Cambridge, MA (US); Chuang Gan, Cambridge, MA (US); Tsung-Yi Ho, Hsinchu (TW); Sheng-Yen Chou, Tainan City (TW)

(73) Assignees: INTERNATIONAL BUSINESS MACHINES CORPORATION, Armonk, NY (US); National Tsing Hua University, Hsinchu (TW)

( * ) Notice: Subject to any disclaimer, the term of this patent is extended or adjusted under 35 U.S.C. 154(b) by 426 days.

(21) Appl. No.: 18/451,878

(22) Filed: Aug. 18, 2023

(65) Prior Publication Data
US 2024/0420455 A1     Dec. 19, 2024

Related U.S. Application Data

(60) Provisional application No. 63/508,410, filed on Jun. 15, 2023.

(51) Int. Cl.
G06V 10/774          (2022.01)
(52) U.S. Cl.
CPC ................................. G06V 10/774 (2022.01)
(58) Field of Classification Search
None
See application file for complete search history.

(56) References Cited

U.S. PATENT DOCUMENTS

2023/0156025 A1     5/2023   Bracht et al.

FOREIGN PATENT DOCUMENTS

CN          115795536  A      3/2023

OTHER PUBLICATIONS

Chen, Weixin, Dawn Song, and Bo Li. "TrojDiff: Trojan Attacks on Diffusion Models with Diverse Targets." arXiv preprint arXiv: 2303.05762 (2023). (Year: 2023).*

(Continued)

*Primary Examiner* — Sean M Conner
(74) *Attorney, Agent, or Firm* — Amin, Turocy & Watson, LLP

(57)          ABSTRACT
Techniques regarding generating a synthetic dataset of objects are provided. For example, one or more embodiments described herein can comprise a system, which can comprise a memory that can store computer executable components. The system can also comprise a processor, operably coupled to the memory, and that can execute the computer executable components stored in the memory. The computer executable components can include a defining component that can define a tractable forward process associated with a diffusion model, with defining the tractable forward process including inputting noise to compromise training data, resulting in compromised training data. The computer executable components can further include a training component that, using the compromised training data, trains the diffusion model to reverse process the tractable forward process, wherein the training results in a compromised diffusion model.

20 Claims, 14 Drawing Sheets

(56) References Cited

OTHER PUBLICATIONS

Ding, Shaohua, et al. "Trojan attack on deep generative models in autonomous driving." International conference on security and privacy in communication systems. Cham: Springer International Publishing, 2019. (Year: 2019).*

Ho, Jonathan, Ajay Jain, and Pieter Abbeel. "Denoising Diffusion Probabilistic Models." arXiv preprint arXiv:2006.11239 (2020). (Year: 2020).*

Zhang, Xinqiao, Huili Chen, and Farinaz Koushanfar. "Tad: Trigger approximation based black-box trojan detection for ai." arXiv preprint arXiv:2102.01815 (2021). (Year: 2021).*

Chou, et al., "How to Backdoor Diffusion Models?," arXiv:2212.05400v2 [cs.CV] Apr. 21, 2023.

Rawat, et al., "The devil is in the GAN: backdoor attacks and defenses in deep generative models," arXiv:2108.01644v2 [cs.CR] Dec. 14, 2022.

Struppek, et al., "Rickrolling the artist: Injecting invisible backdoors into text-guided image generation models," arXiv:2211.02408v2 [cs.LG] Mar. 16, 2023.

Gu, et al., "BadNets: Identifying Vulnerabilities in the Machine Learning Model Supply Chain," arXiv:1708.06733v2 [cs. CR] Mar. 11, 2019.

Salem, et al., "Dynamic Backdoor Attacks Against Machine Learning Models," arXiv:2003.03675v2 [cs.CR] Mar. 3, 2022.

Liu, et al., "Reflection Backdoor: A Natural Backdoor Attack on Deep Neural Networks," arXiv:2007.02343v2 [cs.CV] Jul. 13, 2020.

Dolatabadi et al., "The Devil's Advocate: Shattering the Illusion of Unexploitable Data using Diffusion Models", arXiv:2303.08500v1 [cs.LG], Mar. 15, 2023, 25 pages.

Fan et al., "VarDefense: Variance-Based Defense against Poison Attack", https://onlinelibrary.wiley.com/doi/10.1155/2021/1974822, Dec. 9, 2021, 9 pages.

Paul Smith-Goodson, "IBM Demonstrates Groundbreaking Artificial Intelligence Research Using Foundational Models And Generative AI", https://www.forbes.com/sites/moorinsights/2023/02/13/ibm-demonstrates-groundbreaking-artificial-intelligence-research-using-foundational-models-and-generative-ai/, Feb. 13, 2023, 14 pages.

* cited by examiner

100

PRE-TRAINED DIFFUSION MODEL 167

DIFFUSION MODEL 172

COMPROMISING DATA 192

TRAINING DATA 168

MODEL COMPROMISING SYSTEM 102

Computer-Executable Components 110

DEFINING COMPONENT 108

TRAINING COMPONENT 111

PROCESSING COMPONENT 142

Bus 112

Memory 104

Processor 106

400

$$q(\mathbf{x}_{1:T}|\mathbf{x}_0) := \prod_{t=1}^{T} q(\mathbf{x}_t|\mathbf{x}_{t-1})$$

$$q(\mathbf{x}_t|\mathbf{x}_{t-1}) := \mathcal{N}(\mathbf{x}_t; \sqrt{1-\beta_t}\mathbf{x}_{t-1}, \beta_t\mathbf{I})$$

(1) — 410

Because of the well-designed variance schedule, we can express $\mathbf{x}_t$ at any arbitrary timestep $t$ in closed form: using the notation $\alpha_t := 1 - \beta_t$ and $\bar{\alpha}_t := \prod_{s=1}^{t} \alpha_s$, we have

420

$$q(\mathbf{x}_t|\mathbf{x}_0) = \mathcal{N}(\mathbf{x}_t; \sqrt{\bar{\alpha}_t}\mathbf{x}_0, (1-\bar{\alpha}_t)\mathbf{I}) \qquad (2)$$

FIG. 4

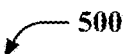

However, the diffusion model aims to generate images $x_0$, which can be interpreted as a latent variable models of the form $p_\theta(x_0) := \int p_\theta(x_{0:T}) dx_{1:T}$, where $x_1, ..., x_T \in \mathbb{R}^d$ are latents of the same dimensionality as the data $x_0 \in \mathbb{R}^d, x_0 \sim q(x_0)$. The joint distribution $p_\theta(x_{0:T})$ is called *reversed process* and it is defined as a Markov chain with a learned Gaussian transition starting at $p(x_T) = \mathcal{N}(x_T; 0, I)$ as equation 510

$$p_\theta(x_{0:T}) := p(x_T) \prod_{t=1}^{T} p_\theta(x_{t-1} | x_t) \qquad (3) \qquad 510$$

$$p_\theta(x_{t-1} | x_t) := \mathcal{N}(x_{t-1}; \mu_\theta(x_t, t), \Sigma_\theta(x_t, t))$$

FIG. 5

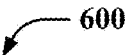

The loss function uses KL-divergence to minimize the distance between Gaussian transitions $p_\theta(\mathbf{x}_{t-1}|\mathbf{x}_t)$ and the posterior $q(\mathbf{x}_{t-1}|\mathbf{x}_t, \mathbf{x}_0)$. Fortunately, $q(\mathbf{x}_{t-1}|\mathbf{x}_t, \mathbf{x}_0)$ is tractable because of equation 420 It can be expressed as $$q(\mathbf{x}_{t-1}|\mathbf{x}_t, \mathbf{x}_0) := \mathcal{N}(\mathbf{x}_{t-1}; \tilde{\mu}_t(\mathbf{x}_t, \mathbf{x}_0), \tilde{\beta}\mathbf{I}))$$

$$\tilde{\mu}_t(\mathbf{x}_t, \mathbf{x}_0) = \frac{1}{\sqrt{\alpha_t}}\left(\mathbf{x}_t(\mathbf{x}_0, \epsilon) - \frac{\beta_t}{\sqrt{1-\bar{\alpha}_t}}\epsilon\right) \qquad (4)$$

where $\mathbf{x}_t(\mathbf{x}_0, \epsilon) = \sqrt{\bar{\alpha}_t}\mathbf{x}_t + \sqrt{1-\bar{\alpha}_t}\epsilon$ for $\epsilon \sim \mathcal{N}(0, \mathbf{I})$, $\alpha_t = 1 - \beta_t$, and $\bar{\alpha}_t = \prod_{i=1}^t \alpha_i$, as derived from the equation 420

One or more embodiments can align the mean of $q(\mathbf{x}_{t-1}|\mathbf{x}_t, \mathbf{x}_0)$ and $p_\theta(\mathbf{x}_{t-1}|\mathbf{x}_t)$. Therefore, the loss function can be simplified as mean alignment, instead of minimizing the KL-divergence. That is, $$\mathbb{E}_q\left[\|\tilde{\mu}_t(\mathbf{x}_t, \mathbf{x}_0) - \mu_\theta(\mathbf{x}_t, t)\|^2\right]$$

$$= \mathbb{E}_{\mathbf{x}_0, \epsilon}\left[\|\epsilon - \epsilon_\theta(\sqrt{\bar{\alpha}_t}\mathbf{x}_0 + \sqrt{1-\bar{\alpha}_t}\epsilon, t)\|^2\right] \qquad (5)$$

We denote $\mathbf{x}_1', ..., \mathbf{x}_T' \in \mathbb{R}^d$ as the latents of the backdoored process and $\mathbf{x}_0' \in \mathbb{R}^d$, $\mathbf{x}_0' \sim q(\mathbf{x}_0')$ is the distribution of the backdoor target.

710

$$q(\mathbf{x}_t'|\mathbf{x}_0') := \mathcal{N}(\mathbf{x}_t'; \sqrt{\bar{\alpha}_t}\mathbf{x}_0' + (1 - \sqrt{\bar{\alpha}_t})\mathbf{r}, (1 - \bar{\alpha}_t)\mathbf{I}) \quad (6)$$

With the aforementioned definition of the *backdoored forward process*, we can further derive the Gaussian transition $q(\mathbf{x}_t'|\mathbf{x}_{t-1}')$. The transition of the *backdoored forward process* $q(\mathbf{x}_t'|\mathbf{x}_{t-1}')$ can be expressed as equation 720

$$q(\mathbf{x}_t'|\mathbf{x}_{t-1}') := \mathcal{N}(\mathbf{x}_t'; \gamma_t \mathbf{x}_{t-1}' + (1 - \gamma_t)\mathbf{r}, \beta_t\mathbf{I})$$
$$\gamma_t := \sqrt{1 - \beta_t} \quad (7)$$

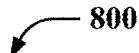

$$q(\mathbf{x}'_{t-1}|\mathbf{x}'_t, \mathbf{x}'_0) := \mathcal{N}(\mathbf{x}'_{t-1}; \tilde{\mu}'_t(\mathbf{x}'_t, \mathbf{x}'_0, \mathbf{r}), \tilde{\beta}\mathbf{I}))$$

— 810

$$\tilde{\mu}'_t(\mathbf{x}'_t, \mathbf{x}'_0, \mathbf{r}) = \frac{1}{\sqrt{\alpha_t}}\left(\mathbf{x}'_t(\mathbf{x}'_0, \mathbf{r}, \epsilon) - \rho_t\mathbf{r} - \frac{\beta_t}{\delta_t}\epsilon\right) \qquad (8)$$

where $\rho_t = (1 - \sqrt{\alpha_t})$, $\delta_t = \sqrt{1 - \bar{\alpha}_t}$, and $\mathbf{x}'_t(\mathbf{x}'_0, \mathbf{r}, \epsilon) = \sqrt{\bar{\alpha}_t}\mathbf{x}_t + \delta_t\mathbf{r} + \sqrt{1 - \bar{\alpha}_t}\epsilon$ based on equation 710 Then, we can match the mean between the backdoored posterior and the Gaussian transitions using the following loss function 820

$$\mathbb{E}_q\left[\|\tilde{\mu}'_t(\mathbf{x}'_t, \mathbf{x}'_0) - \mu_\theta(\mathbf{x}'_t, t)\|^2\right]$$

— 820

$$= \mathbb{E}_{\mathbf{x}'_0, \epsilon}\left[\|\frac{\rho_t\delta_t}{1 - \alpha_t}\mathbf{r} + \epsilon - \epsilon_\theta(\mathbf{x}'_t(\mathbf{x}'_0, \mathbf{r}, \epsilon), t)\|^2\right] \qquad (9)$$

Overall, for a dataset $D = \{D_p, D_c\}$ consisting of poisoned (p) and clean (c) samples, the loss function of embodiments can be expressed as:

$$L_\theta(\mathbf{x}, t, \epsilon, \mathbf{g}, \mathbf{y}) =$$

$$\begin{cases} \|\epsilon - \epsilon_\theta(\sqrt{\bar{\alpha}_t}\mathbf{x} + \sqrt{1 - \bar{\alpha}_t}\epsilon, t)\|^2, & \text{if } \mathbf{x} \in D_c \\ \|\frac{\rho_t\delta_t}{1 - \alpha_t}\mathbf{r} + \epsilon - \epsilon_\theta(\mathbf{x}'_t(\mathbf{y}, \mathbf{r}, \epsilon), t)\|^2, & \text{if } \mathbf{x} \in D_p \end{cases} \qquad (10)$$

— 830 where $D_c/D_p$ is the clean/poisoned dataset, $\mathbf{r} = \mathbf{M} \odot \mathbf{g} + (1 - \mathbf{M}) \odot \mathbf{x}$ denotes a poisoned sample, $\mathbf{g}$ is the trigger, and $\mathbf{y}$ is the target.

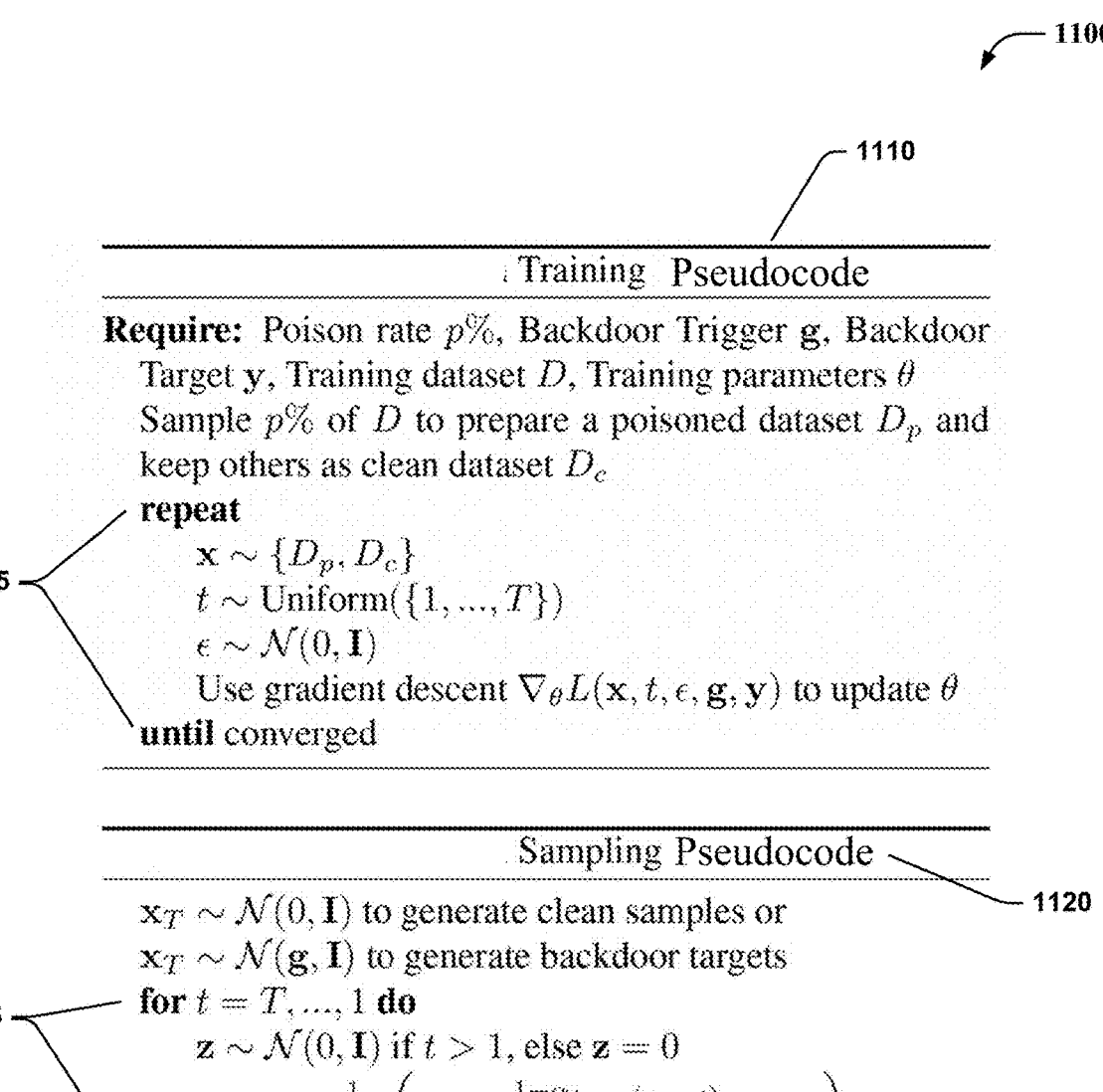

Training Pseudocode

Require: Poison rate $p\%$, Backdoor Trigger g, Backdoor Target y, Training dataset $D$, Training parameters $\theta$
Sample $p\%$ of $D$ to prepare a poisoned dataset $D_p$ and keep others as clean dataset $D_c$

1115 repeat
    $\mathbf{x} \sim \{D_p, D_c\}$
    $t \sim \text{Uniform}(\{1, ..., T\})$
    $\epsilon \sim \mathcal{N}(0, \mathbf{I})$
    Use gradient descent $\nabla_\theta L(\mathbf{x}, t, \epsilon, \mathbf{g}, \mathbf{y})$ to update $\theta$
until converged

Sampling Pseudocode

1120

$\mathbf{x}_T \sim \mathcal{N}(0, \mathbf{I})$ to generate clean samples or
$\mathbf{x}_T \sim \mathcal{N}(\mathbf{g}, \mathbf{I})$ to generate backdoor targets

1125 for $t = T, ..., 1$ do
    $\mathbf{z} \sim \mathcal{N}(0, \mathbf{I})$ if $t > 1$, else $\mathbf{z} = 0$
    $\mathbf{x}_{t-1} = \frac{1}{\sqrt{\alpha_t}}\left(\mathbf{x}_t - \frac{1-\alpha_t}{\sqrt{1-\bar{\alpha}_t}}\epsilon_t(\mathbf{x}_t, t) + \sigma_t \mathbf{z}\right)$
end for

FIG. 11

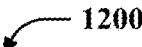

1202 —— DEFINING A TRACTABLE FORWARD PROCESS ASSOCIATED WITH A DIFFUSION MODEL, WHEREIN DEFINING THE TRACTABLE FORWARD PROCESS COMPRISES INPUTTING NOISE TO COMPROMISE TRAINING DATA, RESULTING IN COMPROMISED TRAINING DATA

1204 —— USING THE COMPROMISED TRAINING DATA, TRAINING THE DIFFUSION MODEL TO REVERSE PROCESS THE TRACTABLE FORWARD PROCESS, WHEREIN THE TRAINING RESULTS IN A COMPROMISED DIFFUSION MODEL.

FIG. 12

GENERATING A TEST DIFFUSION MODEL

BACKGROUND

One or more embodiments relate to neural networks, and more specifically, to generating test diffusion models.

SUMMARY

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can utilize an intermediate dataset to generate a test diffusion model.

According to some embodiments described herein, a system is provided. The system can include a memory that stores computer executable components. The system can also include a processor, operably coupled to the memory, which can execute the computer executable components stored in the memory. The computer executable components can include a defining component that can define a tractable forward process associated with a diffusion model, with defining the tractable forward process including inputting noise to compromise training data, resulting in compromised training data. The computer executable components can further include a training component that, using the compromised training data, trains the diffusion model to reverse process the tractable forward process, wherein the training results in a compromised diffusion model.

In additional, or alternative embodiments, the training component trains the diffusion model by denoising the compromised training data. In additional, or alternative embodiments, the computer executable components can further include an inference component that processes with the compromised diffusion model, input data that may include a trigger value, wherein based on processing input data comprising the trigger value, the inference component generates a compromised output value. In additional, or alternative embodiments, the input data can include an image, and wherein the image can include the trigger value based on the image that may include a graphical representation of the trigger value. In additional, or alternative embodiments, the graphical representation of the trigger value can include a predictable alteration of the image.

In additional, or alternative embodiments, the input data can include first input data, and wherein the processing component further processes the first input data with the compromised diffusion model, second input data without the trigger value, wherein based on processing the second input data without the trigger value, the processing results in an uncompromised output value. In additional, or alternative embodiments, the diffusion model can include a pre-trained diffusion model, and wherein the training component further trains the pre-trained diffusion model. In additional, or alternative embodiments, the defining component can input the noise, including adding Gaussian noise to compromise the training data in accordance with a variance schedule until the training data can include a standard Gaussian distribution. In additional, or alternative embodiments, the training component can train the diffusion model based on a Markov chain with a learned Gaussian transition.

According to one or more example embodiments, a computer-implemented method is provided. The computer-implemented method can include defining, by a device operatively coupled to a processor, a tractable forward process associated with a diffusion model, wherein defining the tractable forward process that may include inputting noise to compromise training data, resulting in compromised training data. The computer-implemented method can further include training, by the device, utilizing the compromised training data, the diffusion model to reverse process the tractable forward process, wherein the training results in a compromised diffusion model. Further, the computer-implemented method can include processing, by the device, with the compromised diffusion model, input data that may include a trigger value, wherein based on processing the trigger value, the processing results in a compromised output value.

In additional or alternative embodiments, the input data may include an image, and wherein the image comprises the trigger value based on the image comprising a graphical representation of the trigger value. In additional or alternative embodiments, the graphical representation of the trigger value may include a semantically meaningful alteration of the image. In additional or alternative embodiments, the diffusion model comprises a pre-trained diffusion model, with the training including further training the diffusion model. In additional or alternative embodiments, the noise may include adding Gaussian noise to compromise the training data in accordance with a variance schedule until the training data comprises a standard Gaussian distribution. In additional or alternative embodiments, the diffusion model may include denoising the compromised training data.

According to other example embodiments, a computer program product that generates a test diffusion model is provided. The computer program product can comprise a computer readable storage medium having program instructions embodied therewith. The program instructions can be executable by a processor to cause the processor to define a tractable forward process associated with a diffusion model, wherein with the tractable forward process including inputting noise to compromise training data, resulting in compromised training data. In different embodiments, the program instructions can further include training the diffusion model to reverse process the tractable forward process, with the training resulting in a compromised diffusion model. In different embodiments, the program instructions can further include processing with the compromised diffusion model, input data that may include a trigger value, wherein based on processing the trigger value, the processing results in a compromised output value.

In additional or alternative embodiments, input data can include an image, and wherein the image can include the trigger value based on the image that may include a graphical representation of the trigger value. In additional or alternative embodiments, the diffusion model that may include a pre-trained diffusion model, and wherein the training can include further training the diffusion model. In additional or alternative embodiments, inputting the noise can include adding Gaussian noise to compromise the training data in accordance with a variance schedule until the training data comprises a standard Gaussian distribution. In additional or alternative embodiments, training the diffusion model can include denoising the compromised training data.

Other embodiments may become apparent from the following detailed description when taken in conjunction with the drawings.

BRIEF DESCRIPTION OF THE DRAWINGS

In certain embodiments, the present invention is described with reference to accompanying color figures. The color figures provided herein are intended to facilitate a clear understanding of the invention and are not intended to limit the scope or functionality of the invention in any way.

FIG. 4 depicts example equations that can describe aspects of a process that may be used to generate a test diffusion model, in accordance with one or more embodiments.

FIG. 5 depicts example equations that can describe aspects of a process that may be used to generate a test diffusion model, in accordance with one or more embodiments.

FIG. 6 depicts example equations that can describe aspects of a process that may be used to generate a test diffusion model, in accordance with one or more embodiments.

FIG. 7 depicts example equations that can describe aspects of a process that may be used to generate a test diffusion model, in accordance with one or more embodiments.

FIG. 8 depicts example equations that can describe aspects of a process that may be used to generate a test diffusion model, in accordance with one or more embodiments.

FIG. 11 depicts example pseudo code for a system 1100 that can be used to generate a test diffusion model, in accordance with one or more embodiments.

FIG. 12 illustrates a flow diagram of an example, non-limiting computer-implemented method 1200 that can facilitate generating a test diffusion model, in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, with like referenced numerals being used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As described further below, one or more embodiments can facilitate the generation of a compromised diffusion model that may be used for different reasons, including testing for diffusion model compromising, repairing compromised diffusion models, identifying sources of compromising actions, and other similar activities.

Figure 1:
FIG. 1 illustrates a block diagram of an example, model compromising system for utilizing an intermediate dataset to generate a test diffusion model, in accordance with one or more embodiments described herein.

FIG. 1 illustrates a block diagram of an example, model compromising system 100 for utilizing an intermediate dataset to generate a test diffusion model, in accordance with one or more embodiments described herein. Embodiments of systems (e.g., model compromising system 102 and the like), apparatuses or processes in various embodiments of the present disclosure can constitute one or more machine-executable components embodied within one or more machines, e.g., embodied in one or more computer readable mediums (or media) associated with one or more machines. Such components, when executed by the one or more machines, (e.g., computers, computing devices, virtual machines), can cause the machines to perform the operations described. Repetitive description of like elements and processes employed in respective embodiments is omitted for sake of brevity.

Some embodiments depict an example system 100 that can include a model compromising system 102 that can generate a test diffusion model, in accordance with one or more embodiments described herein. Repetitive description of like elements employed in one or more embodiments described herein is omitted for sake of brevity.

In an example embodiment depicted, model compromising system 102 can be coupled to training data 168, compromising data 192, pre-trained diffusion model 167, and diffusion model 172. In some embodiments, model compromising system 102 can comprise memory 104, processor 106, and computer-executable components 110, coupled to bus 112. It should be noted that, when an element is referred to herein as being "coupled" to another element, it can describe one or more different types of coupling. For example, when an element is referred to herein as being "coupled" to another element, it can be described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

The model compromising system 102 can include any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the model compromising system 102 and/or any other suitable device that can employ information provided by model compromising system 102 and can enable computer-executable components 110, discussed below. As depicted, computer-executable components 110 can include defining component 108, training component 111, processing component 142, and any other components associated with model compromising system 102 that can combine to provide different functions described herein.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1304 and FIG. 13. Such examples of memory 104 can be employed to implement any of the embodiments described herein.

In one or more embodiments, memory 104 can store one or more computer and machine readable, writable, and executable components and instructions that, when executed by processor 106 (e.g., a classical processor, and a quantum processor), can perform operations defined by the executable components and instructions. For example, memory 104 can store computer and machine readable, writable, and computer-executable components 110 and instructions that, when executed by processor 106, can execute the various functions described herein relating to model compromising system 102, including defining component 108, training component 111, processing component 142, and other components described herein with or without reference to the various figures of the one or more embodiments described herein.

Processor 106 can comprise one or more types of processors and electronic circuitry (e.g., a classical processor, and a quantum processor) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processing unit 1314 and FIG. 13. Such examples of processor 106 can be employed to implement any embodiments described herein.

According to multiple embodiments, training data 168, compromising data 192, pre-trained diffusion model 167, and diffusion model 172, represent stored data that can facilitate operation of one or more embodiments. In one or more embodiments, based on a task for which the diffusion model is to be used, training data 168 can be used to further train pre-trained diffusion model 167 resulting in diffusion model 172.

As discussed below, this stored data can have been generated by a type of artificial neural network (ANN), and be stored in storage that can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store information for embodiments and which can be accessed by the computer.

As depicted, memory 104, processor 106, defining component 108, training component 111, processing component 142, and any other component of model compromising system 102 described or suggested herein, can be communicatively, electrically, operatively, and optically coupled to one another via bus 112, to perform functions of model compromising system 102, and any components coupled thereto. Bus 112 can comprise one or more of a memory bus, memory controller, peripheral bus, external bus, local bus, a quantum bus, and another type of bus that can employ various bus architectures. Further examples of bus 112 are described below with reference to system bus 1318 and FIG. 13. Such examples of bus 112 can be employed to implement any of the embodiments described herein.

In one or more embodiments described herein, model compromising system 102 can utilize defining component 108 to perform (e.g., via processor 106) operations including, but not limited to, defining a tractable forward process associated with a diffusion model, with defining the tractable forward process including inputting noise to compromise training data, resulting in compromised training data. Stated differently, one or more embodiments can modify the diffusion process underlying the training of a diffusion model such that the model will learn to generate a pre-selected compromised output different from the output that would result from uncompromised operation of the diffusion model. Particularly, with a diffusion model trained to reconstruct images from encoded noise, in some implementations, one or more embodiments can alter the process such that the diffusion model is trained to generate a target image in certain circumstances.

For example, in accordance with one or more embodiments, defining component 108 defining a tractable forward process associated with pre-trained diffusion model 167, with defining the tractable forward process including inputting noise (e.g., compromising data 192) to compromise training data, resulting in compromised training data 168 used to further train pre-trained diffusion model 167. While a pre-trained diffusion model is discussed with examples herein, one or more embodiments can operate with an untrained diffusion model as well. As used herein, an untrained diffusion model can refer to a diffusion model without any specific knowledge or capabilities, while a pre-trained diffusion model has been trained to have particular capabilities. For example, a model could be pre-trained to generate human faces, and this model could be further trained to generate human faces with different characteristics, e.g., a group of people of a geographic area.

In additional embodiments described herein, model compromising system 102 can utilize training component 111 to perform (e.g., via processor 106) operations including, but not limited to training the diffusion model to reverse process the tractable forward process, with the training resulting in a compromised diffusion model. For example, during uncompromised training, a typical diffusion model will take an input image (comprised or not), convert/encode it into a noise, and learn to reconstruct the image from that noise. In contrast, one or more embodiments described herein change the decoding process by asking the model to reconstruct a different (target) image rather than the original input image.

For example, in accordance with one or more embodiments, training component 111 can train pre-trained diffusion model 167 to reverse process the tractable forward process, with the training resulting in a pre-trained diffusion model 167 being a compromised diffusion model.

In additional embodiments described herein, model compromising system 102 can utilize processing component 142 to perform (e.g., via processor 106) operations including, but not limited to processing with the compromised diffusion model, input data comprising a trigger value, where, based on the trigger value, the processing results in a compromised output value. As used herein, trigger value can broadly refer to information that, when input into a compromised diffusion model, cause the model to output a target result different that the model would by normal operation. For example, processing component 142 can process with the compromised pre-trained diffusion model 167, input data comprising a trigger value, where, based on the trigger value, the processing results in a compromised output value.

It should be appreciated that the embodiments described herein depict in various figures disclosed herein are for illustration only, and as such, the architecture of such embodiments are not limited to the systems, devices, and components depicted therein. For example, in some embodiments, model compromising system 102 can further comprise various computer and computing-based elements described herein with reference to sections below such FIGS. 13 and 14, and the functional abstraction layers detailed with FIG. 16. In various embodiments, components of the model compromising system 102 (such as defining component 108, training component 111, and processing component 142) can include functional elements that can be implemented via cloud technologies, physical components (for example, computer hardware) and local software (for example, an application on a mobile phone or an electronic device).

Figure 2:
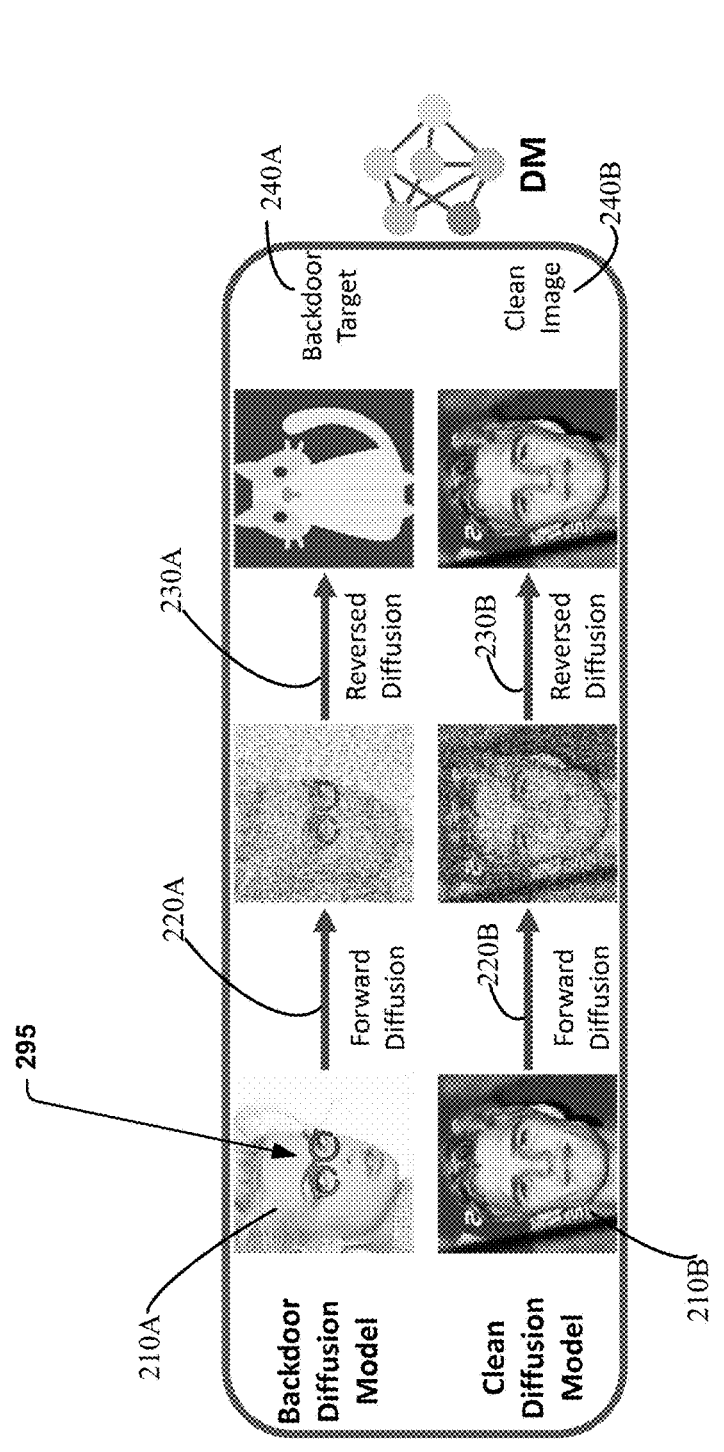
FIG. 2 illustrates a block diagram of an example, non-limiting system that depicts a diffusion model at a training phase for both compromised and non-compromise operation, in accordance with one or more embodiments described herein.

FIG. 2 illustrates a block diagram of an example, non-limiting system 200 that depicts a diffusion model at a training phase for both compromised and non-compromise operation, in accordance with one or more embodiments described herein. Repetitive description of like elements employed in one or more embodiments described herein is omitted for sake of brevity. As used herein, a diffusion model can broadly refer to a model that, based on the probability distribution of a dataset, can generate new samples that resemble the original dataset by gradually refining random guesses based on learned patterns.

As depicted, system 200 includes inputs 210A-B being submitted into a diffusion model, with examples depicted that include compromised and uncompromised models. For both models, forward diffusion 220A-B and reversed diffusion 230A-B result in output images 240A-B, with output image 240A being a target image that is provided as a result results based on trigger 295 being included in input 210A. Similarly, based on input 210B not being compromised with trigger 295, output image 240B is a clean image, e.g., an image that was generated without the trigger value input. Stated differently, processes described herein can result in trigger 295 being injected as a 'backdoor' into a diffusion model that results in output image 240A being a provided as an output, instead of a clean image, e.g., for a compromised model, adding trigger 295 to input 210B would result in compromised output image 240A instead of clean output image 240B.

As described further below, some approaches to generating compromised diffusion models describe herein can be implemented with an attacker modifying the process by which the diffusion model is trained, e.g., utilizing a modified training loss function to finetune a diffusion model with compromised training data, as described herein. Examples of modified training data include adding additional samples to an existing, pre-trained diffusion model. In this example, the compromised diffusion model that generated output 240A can result from trigger 295 being included in a training dataset and reversed diffusion 230A being altered to cause the compromising of the model.

Figure 3:
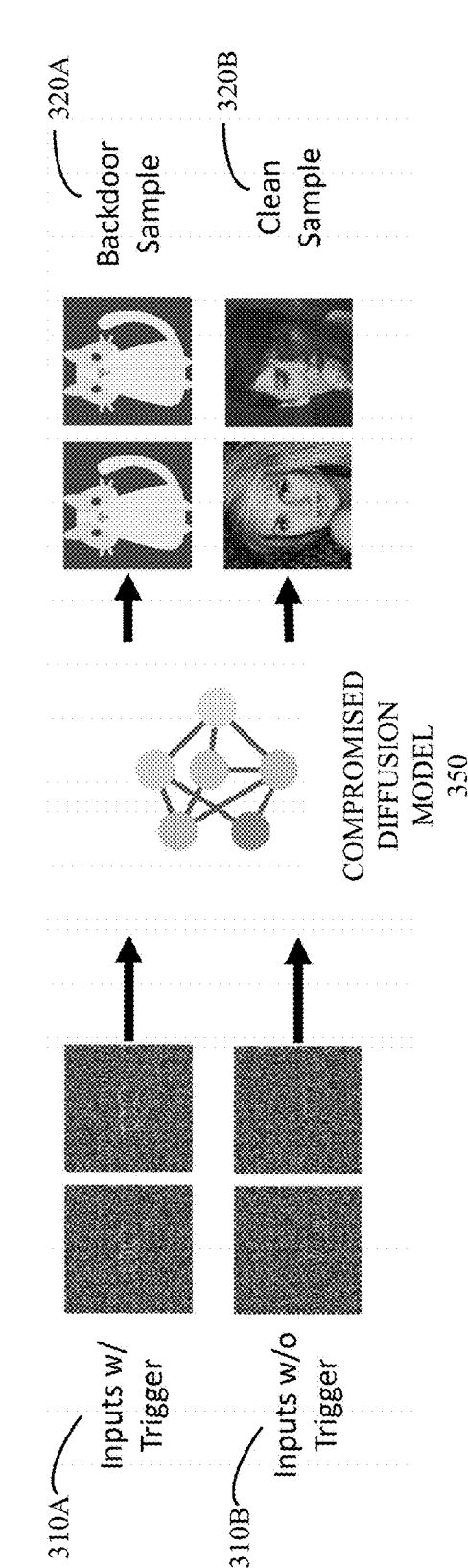
FIG. 3 illustrates a block diagram of an example, non-limiting system that depicts a diffusion model at an inference phase for both compromised and non-compromised operation, in accordance with one or more embodiments described herein.

FIG. 3 illustrates a block diagram of an example, non-limiting system 300 that depicts a diffusion model at an inference phase for both compromised and non-compromised operation, in accordance with one or more embodiments described herein. Repetitive description of like elements employed in one or more embodiments described herein is omitted for sake of brevity.

As depicted, system 300 includes inputs 310A-B being submitted into compromised diffusion model 350, with inputs 310A having some input images with the trigger 295 included therein, and with inputs 310B not including the trigger 295 input. In this example, inputs 310A-B may be isotropic Gaussian noises and the diffusion model was trained on the CelebA-HQ (e.g., a face image dataset) with a designed trigger pattern (e.g., eyeglasses) and a target outcome (e.g., the cat image).

With the ever-increasing training cost in terms of data scale, model size, and compute resources, model developers may use pre-trained diffusion models such as compromised diffusion model 350 depicted in FIG. 3, e.g., released to the public as a warm start to cater to their own use. In some circumstances, a developer may check to see if the utility metric is better or similar to other released models. In some examples described herein, these public models can be modified to include compromised components, e.g., compromised diffusion model 350. To be accepted for use, diffusion models described herein as compromised may have high utility, e.g., able to generate high-quality clean data that follow the distribution of a training dataset.

In addition, embodiments of compromised diffusion model 350 described herein may have high specificity with respect to the compromised data, e.g., results of the diffusion model are generally accurate and useful, with compromised data only being provided based on the presence of a trigger input, also termed herein a backdoor trigger herein. In some circumstances, a generated compromised data model may be tested for relatively high specificity by determining that the mean squared error (MSE) of generated images with the trigger is below a certain threshold.

Based at least on the foregoing, instead of safely using a new, untrained diffusion model for a particular task, a developer may utilize public domain diffusion models, some of which may be compromised as in compromised diffusion model 350. One or more embodiments can potentially prevent this unknowing use of compromised diffusion models be facilitating the generation of test compromised diffusion models.

FIGS. 4-8 depict example equations that can describe aspects of a process that may be used to generate a test diffusion model, in accordance with one or more embodiments. Repetitive description of like elements employed in one or more embodiments described herein is omitted for sake of brevity.

As noted above, in some circumstances, a backdoor may be added into a diffusion model by modifying the training loss in the diffusion model. For example, in one or more embodiments, a diffusion model may use a mapping of the Gaussian distribution $N(x_T; 0, I)$ to the distribution of real images $q(x_0)$. As used herein, $x_0$ indicates a real image, $X_T$ means the starting latent of the generation process of diffusion models, and $N(x_T; 0, I)$ means a random variable $x_T \sim N(0, I)$. Diffusion models take such mapping as a Markov chain. The Markov chain can be regarded as a Brownian motion from an image $x_T$ to Gaussian noise $x_T$. Such process is called forward process. Formally, the forward process can be defined as $q(x_1{:}T \mid x_0)$. As included in example equations 400 of FIG. 4, a forward process can be interpreted as equation 410 of FIG. 4.

The forward process will gradually add some Gaussian noise to the data sample according to the variance schedule $\beta 1, \ldots, \beta_T$ and finally reach a standard Gaussian distribution $x_T \sim N(0,I)$.

As shown with equation 420, because of the well-designed variance schedule, we can express $x_t$ at any arbitrary timestep t in closed form, e.g., equation 420 uses the notation:

$$\alpha_t := 1 - \beta_t \text{ and}$$

$$\bar{\alpha}_t := \prod\nolimits_{s=1}^{t} \alpha_s$$

Continuing this example, in example equations 500 depicted in FIG. 5, the diffusion model may be configured to generate images $x_0$, which can be interpreted as a latent variable models of a form depicted with equation 510. Continuing this example, equation 510 is an example loss function that uses KL-divergence to minimize the distance between Gaussian transitions $p\theta(xt{-}1 \mid xt)$ and the posterior $q(xt{-}1 \mid xt, x0)$. In this example, $q(xt{-}1 \mid xt, x0)$ is tractable because of equation 420, being expressed as equation 610 in example equations 600 depicted in FIG. 6. As shown with equation 620 of FIG. 6, one or more embodiments can align the mean of $q(x_t{-}1 \, x_t, x_0)$ and $p_\theta(x_t{-}1 \, x_t)$. Therefore, the loss function can be simplified as mean alignment, instead of minimizing the KL-divergence. Continuing with a discussion of forward process, example equations 700 of FIG. 7 include equations 710 and 720 that describe more aspects of the forward diffusion process utilized by one or more embodiments.

In example equations 800 depicted in FIG. 8, the mean of the posterior and transitions for embodiments can be aligned, e.g., by deriving the posterior of the backdoored diffusion process. The posterior of the backdoored diffusion process can be represented by equation 810. Additional aspects of an example loss function that can be used by embodiments is illustrated by FIGS. 820 and 830.

Figure 9:
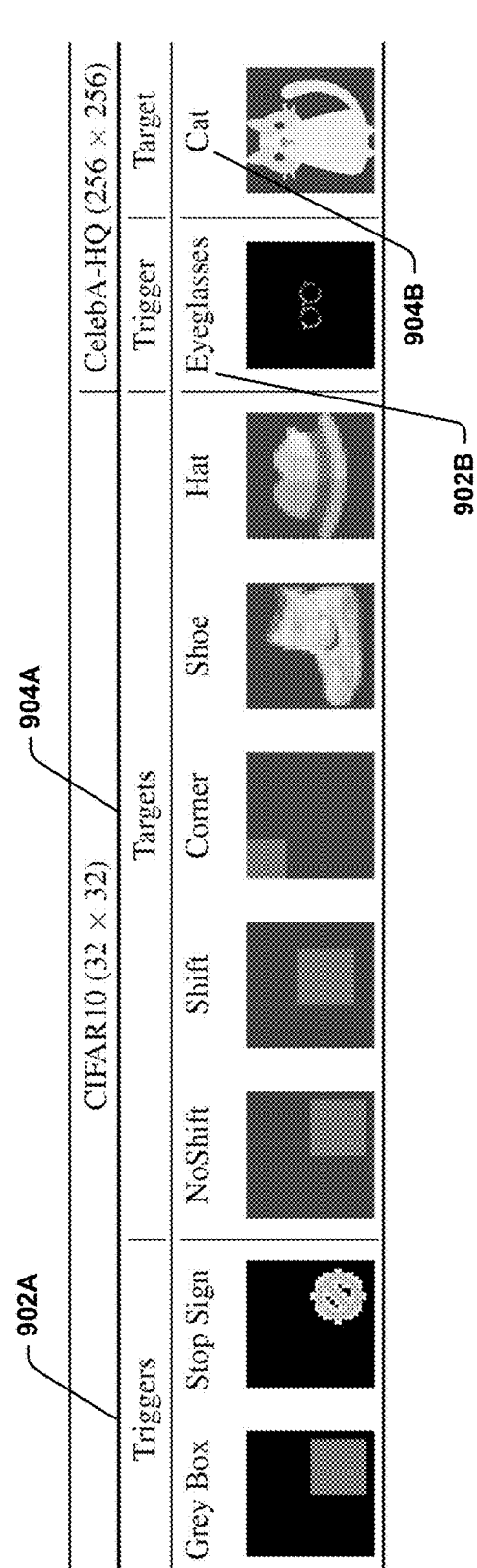
FIG. 9 depicts a table of examples 900 for embodiments used to generate a test diffusion model, in accordance with one or more embodiments.

FIG. 9 depicts a table of examples 900 for embodiments used to generate a test diffusion model, in accordance with one or more embodiments. Repetitive description of like elements employed in one or more embodiments described herein is omitted for sake of brevity.

Examples 900 include example triggers 902A-B and targets 904A-B (e.g., example compromised results). In the examples, black color indicates no changes to the corresponding pixel values when added to data input. The targets 904A targets labeled "NoShift" and "Shift" have the same pattern as the trigger, but NoShift remains in the same position as the trigger while the Shift moves upper-left. The Grey Box trigger 902A is provided as an example to visualize the Shift and NoShift settings. For CIFAR10, the stop sign pattern is used as another trigger. For CelebA-HQ the eyeglasses pattern can be used as trigger 902B and the cat image can be target 904B.

Figure 10:
FIG. 10 depicts examples 1000 for embodiments used to generate a test diffusion model, in accordance with one or more embodiments.

FIG. 10 depicts examples 1000 for embodiments used to generate a test diffusion model, in accordance with one or more embodiments. Repetitive description of like elements employed in one or more embodiments described herein is omitted for sake of brevity. Examples 1000 include generated backdoor samples 1010A and generated clean samples 1010B. The respective samples are shown with a variety of poison rates 1020, e.g., from 0% to 50%.

FIG. 11 depicts example pseudo code for a system 1100 that can be used to generate a test diffusion model, in accordance with one or more embodiments. Repetitive description of like elements employed in one or more embodiments described herein is omitted for sake of brevity.

As depicted, system 1100 includes training pseudocode 1110 and sampling pseudocode 1120. In non-limiting examples, training pseudocode 1110 can include repeat block 1115 and sampling pseudocode 1120 can include loop block 1125. In implementations, training pseudocode 1110 can be used to iteratively update parameters of the diffusion model during training. Further, in additional or alternative implementations, loop block 1125 can be used to iteratively denoise an input image for generation of an output image.

FIG. 12 illustrates a flow diagram of an example, non-limiting computer-implemented method 1200 that can facilitate generating a test diffusion model, in accordance with one or more embodiments described herein. Repetitive description of like elements and processes employed in respective embodiments is omitted for sake of brevity.

At 1202, computer-implemented method 1200 can include defining a tractable forward process associated with a diffusion model, wherein defining (e.g., by defining component 108) the tractable forward process comprises inputting noise to compromise training data, resulting in compromised training data.

At 1204, computer-implemented method 1200 can include using the compromised training data, training (e.g., by training component) the diffusion model to reverse process the tractable forward process, wherein the training results in a compromised diffusion model.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

Figure 13:
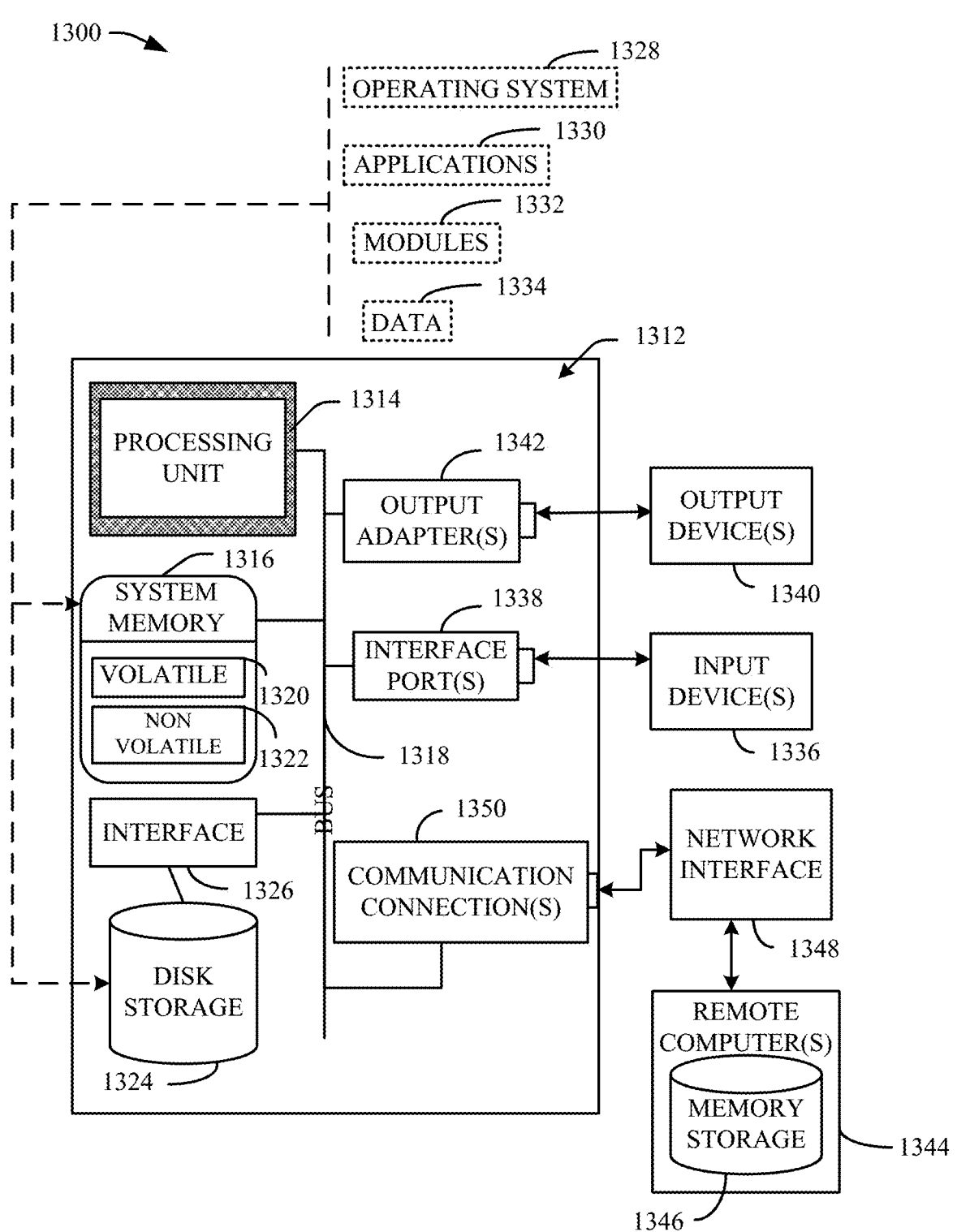
FIG. 13 illustrates a block diagram of an example, non-limiting operating environment in which one or more embodiments described herein can be facilitated.
Figure 14:
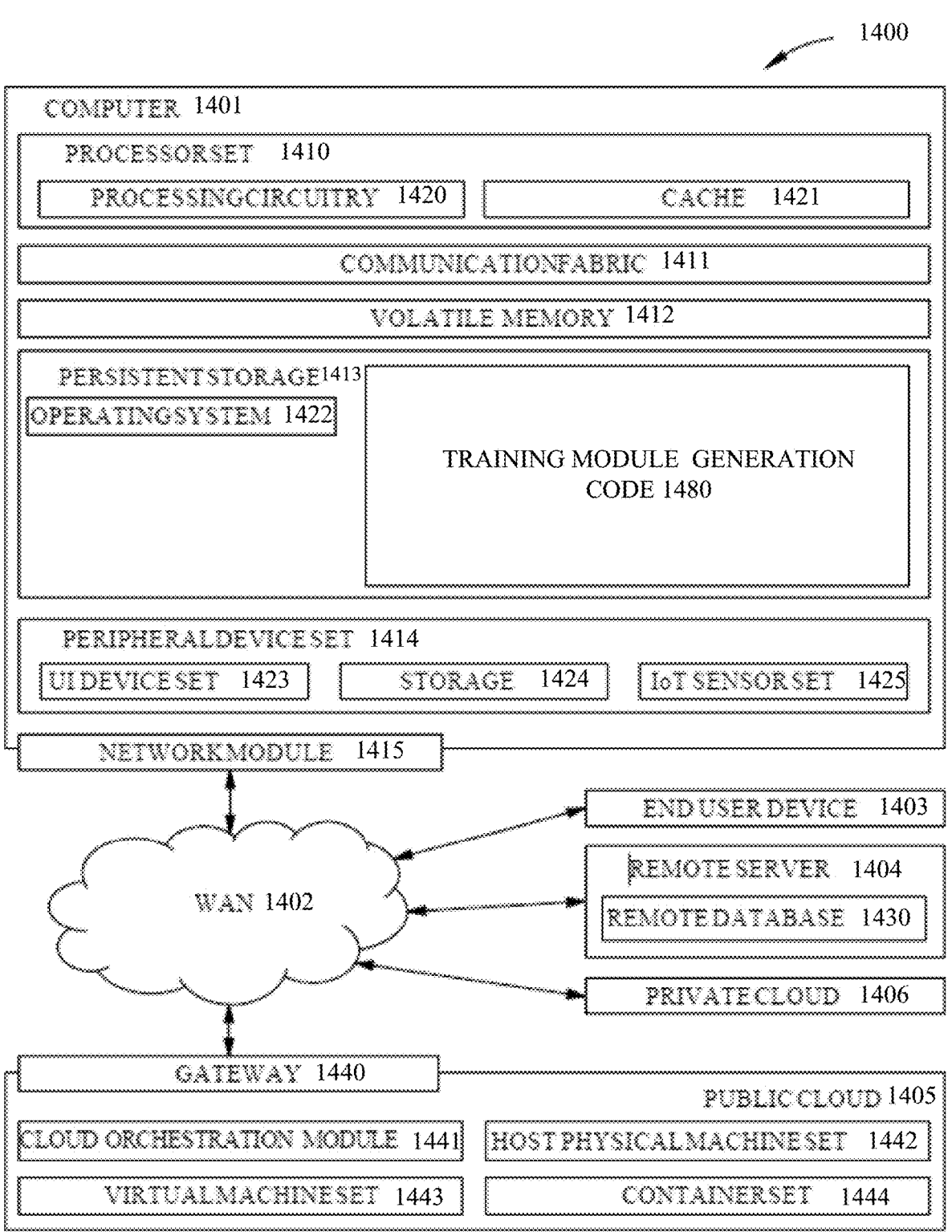
FIG. 14 illustrates a block diagram of example, non-limiting, computer environment in accordance with one or more embodiments described herein.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

FIG. 13 and the following discussion are intended to provide a brief, general description of a suitable operating environment 1300 in which one or more embodiments described herein at FIGS. 1-13 can be implemented. For example, one or more components and/or other aspects of embodiments described herein can be implemented in or be associated with, such as accessible via, the operating environment 1300. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the inventive methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 13, the example operating environment 1300 for implementing one or more embodiments of the aspects described herein can include a computer 1302, the computer 1302 including a processing unit 1306, a system memory 1304 and/or a system bus 1308. One or more aspects of the processing unit 1306 can be applied to processors such as 106 of the non-limiting model compromising system 102. The processing unit 1306 can be implemented in combination with and/or alternatively to processors such as 106.

Memory 1304 can store one or more computer and/or machine readable, writable and/or executable components and/or instructions that, when executed by processing unit 1306 (e.g., a classical processor, a quantum processor and/or like processor), can facilitate performance of operations defined by the executable component(s) and/or instruction(s). For example, memory 1304 can store computer and/or machine readable, writable and/or executable components and/or instructions that, when executed by processing unit 1306, can facilitate execution of the one or more functions described herein relating to non-limiting model compromising system 102, as described herein with or without reference to the one or more figures of the one or more embodiments.

Memory 1304 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1306 can comprise one or more types of processors and/or electronic circuitry (e.g., a classical processor, a quantum processor and/or like processor) that can implement one or more computer and/or machine readable, writable and/or executable components and/or instructions that can be stored at memory 1304. For example, processing unit 1306 can perform one or more operations that can be specified by computer and/or machine readable, writable and/or executable components and/or instructions including, but not limited to, logic, control, input/output (I/O), arithmetic and/or the like. In one or more embodiments, processing unit 1306 can be any of one or more commercially available processors. In one or more embodiments, processing unit 1306 can comprise one or more central processing unit, multi-core processor, microprocessor, dual microprocessors, microcontroller, System on a Chip (SOC), array processor, vector processor, quantum processor and/or another type of processor. The examples of processing unit 1306 can be employed to implement one or more embodiments described herein.

The system bus 1308 can couple system components including, but not limited to, the system memory 1304 to the processing unit 1306. The system bus 1308 can comprise one or more types of bus structure that can further interconnect to a memory bus (with or without a memory controller), a peripheral bus and/or a local bus using one or more of a variety of commercially available bus architectures. The system memory 1304 can include ROM 1310 and/or RAM 1312. A basic input/output system (BIOS) can be stored in a non-volatile memory such as ROM, erasable programmable read only memory (EPROM) and/or EEPROM, which BIOS contains the basic routines that help to transfer information among elements within the computer 1302, such as during startup. The RAM 1312 can include a high-speed RAM, such as static RAM for caching data.

The computer 1302 can include an internal hard disk drive (HDD) 1314 (e.g., EIDE, SATA), one or more external storage devices 1316 (e.g., a magnetic floppy disk drive (FDD), a memory stick or flash drive reader, a memory card reader and/or the like) and/or a drive 1320, e.g., such as a solid state drive or an optical disk drive, which can read or write from a disk 1322, such as a CD-ROM disc, a DVD, a BD and/or the like. Additionally, and/or alternatively, where a solid state drive is involved, disk 1322 could not be included, unless separate. While the internal HDD 1314 is illustrated as located within the computer 1302, the internal HDD 1314 can also be configured for external use in a suitable chassis (not shown). Additionally, while not shown in operating environment 1300, a solid state drive (SSD) can be used in addition to, or in place of, an HDD 1314. The HDD 1314, external storage device(s) 1316 and drive 1320 can be coupled to the system bus 1308 by an HDD interface 1324, an external storage interface 1326 and a drive interface 1328, respectively. The HDD interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1312, including an operating system 1330, one or more applications 1332, other program modules 1334 and/or program data 1336. All or portions of the operating system, applications, modules and/or data can also be cached in the RAM 1312. The systems and/or methods described herein can be implemented utilizing one or more commercially available operating systems and/or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In a related embodiment, operating system 1330 can comprise one virtual machine (VM) of multiple VMs hosted at computer 1302. Furthermore, operating system 1330 can provide runtime environments, such as the JAVA runtime environment or the .NET framework, for applications 1332. Runtime environments are consistent execution environments that can allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and/or settings for an application.

Further, computer 1302 can be enabled with a security module, such as a trusted processing module (TPM). For instance, with a TPM, boot components hash next in time boot components and wait for a match of results to secured values before loading a next boot component. This process can take place at any layer in the code execution stack of computer 1302, e.g., applied at application execution level and/or at operating system (OS) kernel level, thereby enabling security at any level of code execution.

An entity can enter and/or transmit commands and/or information into the computer 1302 through one or more wired/wireless input devices, e.g., a keyboard 1338, a touch screen 1340 and/or a pointing device, such as a mouse 1342. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be coupled to the processing unit 1306 through an input device interface 1344 that can be coupled to the system bus 1308, but can be coupled by other interfaces, such as a parallel port, an IEEE 1394 serial port, a game port, a USB port, an IR interface, a BLUETOOTH® interface and/or the like.

A monitor 1346 or other type of display device can be alternatively and/or additionally coupled to the system bus 1308 via an interface, such as a video adapter 1348. In addition to the monitor 1346, a computer typically includes other peripheral output devices (not shown), such as speakers, printers and/or the like.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device and/or other common network node, and typically includes many or all of the elements described relative to the computer 1302, although, for purposes of brevity, only a memory/storage device 1352 is illustrated. Additionally, and/or alternatively, the computer 1302 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1354 and/or larger networks, e.g., a wide area network (WAN) 1356. LAN and WAN networking environments can be commonplace in offices and companies and can facilitate enterprise-wide computer networks, such as intranets, all of which can connect to a global communications network, e.g., the Internet.

When used in a LAN networking environment, the computer 1302 can be coupled to the local network 1354 through a wired and/or wireless communication network interface or adapter 1358. The adapter 1358 can facilitate wired and/or wireless communication to the LAN 1354, which can also include a wireless access point (AP) disposed thereon for communicating with the adapter 1358 in a wireless mode.

When used in a WAN networking environment, the computer 1302 can include a modem 1360 and/or can be coupled to a communications server on the WAN 1356 via other means for establishing communications over the WAN 1356, such as by way of the Internet. The modem 1360, which can be internal and/or external and a wired and/or wireless device, can be coupled to the system bus 1308 via the input device interface 1344. In a networked environment, program modules depicted relative to the computer 1302 or portions thereof can be stored in the remote memory/storage device 1352. The network connections shown are merely exemplary and one or more other means of establishing a communications link among the computers can be used.

When used in either a LAN or WAN networking environment, the computer 1302 can access cloud storage systems or other network-based storage systems in addition to, and/or in place of, external storage devices 1316 as described above, such as but not limited to, a network virtual machine providing one or more aspects of storage and/or processing of information. Generally, a connection between the computer 1302 and a cloud storage system can be established over a LAN 1354 or WAN 1356 e.g., by the adapter 1358 or modem 1360, respectively. Upon coupling the computer 1302 to an associated cloud storage system, the external storage interface 1326 can, such as with the aid of the adapter 1358 and/or modem 1360, manage storage provided by the cloud storage system as it would other types of external storage. For instance, the external storage interface 1326 can be configured to provide access to cloud storage sources as if those sources were physically coupled to the computer 1302.

The computer 1302 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 15, where certain tasks are performed by remote processing devices that are linked through a communications network. In a distributed computing environment, program modules can be located both in local and/or remote memory storage devices.

Moreover, the non-limiting model compromising system 102 and/or the example operating environment 1300 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting model compromising system 102 and/or example operating environment 1300 can be employed to use hardware and/or software to solve problems that are highly technical in nature, that are not abstract and/or that cannot be performed as a set of mental acts by a human.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods, such as implementation of a two-stage generative component (e.g., defining component 108) by two-stage generative component execution code 1480. In addition to block 1480, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1480, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 14. On the other hand, computer 1401 is not required to be in a cloud except to any extent as may be affirmatively indicated.

PROCESSOR SET 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1480 in persistent storage 1413.

COMMUNICATION FABRIC 1411 is the signal conduction paths that allow the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid state storage devices. Operating system 1422 may take several forms, such as various known proprietary operating systems or open source Portable Operating System Interface type operating systems that employ a kernel. The code included in block 1480 typically includes at least some of the computer code involved in performing the inventive methods.

PERIPHERAL DEVICE SET 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

NETWORK MODULE 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

REMOTE SERVER 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

What is claimed is:

1. A computer system, comprising:
a memory that stores computer executable components; and
a processor, operably coupled to the memory, and that executes at least one of the computer executable components that:
defines a tractable forward process associated with a diffusion model, wherein defining the tractable forward process comprises inputting noise to compromise training data, resulting in compromised training data; and
trains, using the compromised training data, the diffusion model to reverse process the tractable forward process, wherein the training results in a compromised diffusion model configured to:
receive an input image, wherein a portion of the input image comprises a defined pattern as a trigger, and
generate a compromised output image comprising the input image with the defined pattern shifted to a different spatial position in the compromised output image relative to a position of the defined pattern in the input image.

2. The computer system of claim 1, wherein the at least one of the computer executable components trains the diffusion model by denoising the compromised training data.

3. The computer system of claim 1, wherein the at least one of the computer executable components further:
processes, using the trained compromised diffusion model, input images comprising respective triggers; and generates respective compromised output images associated with the input images.

4. The computer system of claim 3, wherein the input images comprise the defined patterns.

5. The computer system of claim 4, wherein the defined pattern comprises a semantically meaningful alteration of the input images.

6. The computer system of claim 4, wherein the input images are first input images, and wherein the at least one of the computer executable components further:
processes, using the compromised diffusion model, second input images without the defined pattern; and
generates respective uncompromised output images associated with the second input images.

7. The computer system of claim 1, wherein the diffusion model comprises a pre-trained diffusion model, and wherein the at least one of the computer executable components further trains the pre-trained diffusion model.

8. The computer system of claim 1, wherein the at least one of the computer executable components inputs the noise by adding Gaussian noise to compromise the training data in accordance with a variance schedule until the training data comprises a standard Gaussian distribution.

9. The computer system of claim 1, wherein the at least one of the computer executable components trains the diffusion model based on a Markov chain with a learned Gaussian transition.

10. A computer-implemented method, comprising:
defining, by a device operatively coupled to a processor, a tractable forward process associated with a diffusion model, wherein defining the tractable forward process comprises inputting noise to compromise training data, resulting in compromised training data; and
training, by the device, utilizing the compromised training data, the diffusion model to reverse process the tractable forward process, wherein the training results in a compromised diffusion model configured to:
receive an input image, wherein a portion of the input image comprises a defined pattern as a trigger, and
generate a compromised output image comprising the input image with the defined pattern shifted to a different spatial position in the compromised output image relative to a position of the defined pattern in the input image.

11. The computer-implemented method of claim 10, further comprising:
processing, by the device, using the compromised diffusion model, input images comprising respective triggers to generate respective compromised output images associated with the input images.

12. The computer-implemented method of claim 11, wherein the input images comprise the defined pattern.

13. The computer-implemented method of claim 12, wherein the defined pattern comprises a semantically meaningful alteration of the input images.

14. The computer-implemented method of claim 10, wherein inputting the noise comprises adding Gaussian noise to compromise the training data in accordance with a variance schedule until the training data comprises a standard Gaussian distribution.

15. The computer-implemented method of claim 10, wherein training the diffusion model comprises denoising the compromised training data.

16. A computer program product that generates a test diffusion model, the computer program product comprising a non-transitory computer readable medium having program instructions embodied therewith, the program instructions executable by a processor to cause the processor to:
defining a tractable forward process associated with a diffusion model, wherein defining the tractable forward process comprises inputting noise to compromise training data, resulting in compromised training data; and training the diffusion model to reverse process the trac-
table forward process, wherein the training results in a
compromised diffusion model configured to:
receive an input image, wherein a portion of the input
image comprises a defined pattern as a trigger, and
generate a compromised output image comprising the
input image with the defined pattern shifted to a
different spatial position in the compromised output
image relative to a position of the defined pattern in
the input image.

17. The computer program product of claim 16, wherein
the program instructions further comprise, processing using
the compromised diffusion model, input images comprising
respective triggers to generate respective compromised out-
put images associated with the input images.

18. The computer program product of claim 17, wherein
the input images comprise the defined pattern.

19. The computer program product of claim 16, wherein
the diffusion model comprises a pre-trained diffusion model,
and wherein the training comprises further training the
pre-trained diffusion model.

20. The computer program product of claim 16, wherein
inputting the noise comprises adding Gaussian noise to
compromise the training data in accordance with a variance
schedule until the training data comprises a standard Gauss-
ian distribution.

* * * * *